US010182119B2

(12) United States Patent
Lampert et al.

(10) Patent No.: US 10,182,119 B2
(45) Date of Patent: Jan. 15, 2019

(54) SYSTEM AND METHODS FOR FACILITATING COMMUNICATION AMONG A SUBSET OF CONNECTIONS THAT CONNECT TO A WEB APPLICATION

(71) Applicant: Lexmark International Technology Sarl, Meyrin (CH)

(72) Inventors: Donald Emmett Lampert, Roeland, KS (US); Shane Evan Blazek, Shawnee, KS (US); Kristopher John Andrew Haney, Olathe, KS (US); Dylan Christopher Smith, Overland Park, KS (US)

(73) Assignee: HYLAND SWITZERLAND SARL, Geneva (CH)

( * ) Notice: Subject to any disclaimer, the term of this patent is extended or adjusted under 35 U.S.C. 154(b) by 82 days.

(21) Appl. No.: 15/088,927

(22) Filed: Apr. 1, 2016

(65) Prior Publication Data
US 2017/0289263 A1    Oct. 5, 2017

(51) Int. Cl.
G06F 15/16  (2006.01)
H04L 29/08  (2006.01)
H04L 12/58  (2006.01)

(52) U.S. Cl.
CPC ............ *H04L 67/141* (2013.01); *H04L 51/04* (2013.01); *H04L 51/046* (2013.01); *H04L 67/02* (2013.01); *H04L 67/146* (2013.01)

(58) Field of Classification Search
CPC ....... H04L 67/141; H04L 51/04; H04L 67/02; H04L 67/146
USPC .......................................................... 709/227
See application file for complete search history.

(56) References Cited

U.S. PATENT DOCUMENTS

| | | | |
|---|---|---|---|
| 2008/0071901 A1* | 3/2008 | Adelman ........... | G06Q 30/0277 709/223 |
| 2011/0116425 A1* | 5/2011 | Saito ..................... | H04W 8/005 370/310 |
| 2012/0198084 A1* | 8/2012 | Keskitalo ................ | H04L 67/02 709/228 |
| 2017/0273005 A1* | 9/2017 | Daragon ............... | H04W 40/32 |

* cited by examiner

*Primary Examiner* — Taylor A Elfervig
*Assistant Examiner* — Oluwatosin M Gidado
(74) *Attorney, Agent, or Firm* — Zilka-Kotab, P.C.

(57) ABSTRACT

A method for facilitating communication among web connections connecting to a web application is disclosed. The method includes receiving an indication that a web connection to a web application is established, determining if the web connection is a potential host or a potential client connection. The method includes creating a connection group having members that include at least one of the host and the client connection; allowing the members of the connection group to communicate with each other by receiving a request from at least one of the host and the client connection for a message to be communicated to the members of the connection group; and sending the message received from the at least one of the host and the client connection to the members of the connection group.

15 Claims, 5 Drawing Sheets

SYSTEM AND METHODS FOR FACILITATING COMMUNICATION AMONG A SUBSET OF CONNECTIONS THAT CONNECT TO A WEB APPLICATION

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Technical Field

The present invention relates generally to a system and methods of facilitating cross-web connection communication between web connections and a web application.

2. Description of the Related Art

A web connection may be established by a user when the user accesses a web application using a web browser. Since web applications are typically application programs that are stored on a remote server and are delivered over the internet through a browser interface, the user may connect to the remote server of the web application when requesting or retrieving information from the web application. In some instances, the user may access the web application using one or more web connections such as, for example, when the user opens multiple web browsers in a computer to access the web application. When content needs to be shared among a number of web connections to the web application that are being accessed using a number of web browsers, the content may need to be routed to the remote server of the web application, and then pushed to the number of web browsers that are accessing the web application.

For illustrative purposes, a user John Smith may connect to a web application in a first web browser while also connecting to the same or a different web application using a second web browser in the same computing device. When the computing device wishes to push a notification, or share information with user John Smith through the web application such as, for example, when a scanner that is attached to the computing device has finished performing a scan job, the computing device would send the notification or information to the server associated with the web application, and the server would then push the notification or information to the first and second web browsers that are being accessed by the user John Smith.

However, some scenarios may benefit from a faster and more straightforward approach of communicating data among a number of web connections without having to store the data in another device such as the server and have the one or more browsers retrieve the data from the server. A solution is needed for sharing or routing information among a subset of web connections belonging to one session without sharing the information in session settings, pushing the information to a server and pushing the information to each of the web connections. Some solutions may simply push data to the one or more browsers accessing the web application on the same computing device, but a computer may have a number of web connections to the web application, with some web connections having differing credentials and with some web connections coming from different sessions.

Web connections do not necessarily know what session they are on. Web connections may also be connected to different web applications or may access the web applications using different credentials. Even web connections that are running in the same sessions may also have different credentials when connecting to a web application (i.e. user A on web connection 1 and user B on web connection 2).

Accordingly, there is a need for a system and methods for facilitating cross-web connection communication in a way that precludes communication between web connections that have different credentials. There is also a need for a method that allows a subset of web communications running in a session to communicate with each other, wherein the subset precludes web connections that have different desired web software or destination URLs, different sessions, and/or using different credentials.

SUMMARY

A system capable of and methods of facilitating communication among a subset of connections that connect to a web application are disclosed. One example method for facilitating communication among the subset of web connections connecting to a web application includes receiving an indication that a web connection to a web application is established. It is then determined if the web connection is a host or if the web connection is a client connection. The method further includes creating a connection group having members that include at least one of the host and the client connection. The members of the connection group may then communicate with each other by receiving a request from at least one of the members of the connection group, such as the host and the client connection, for a message to be communicated to the other members of the connection group. The message received from the at least one of the host and the client connection may then be sent to the members of the connection group.

From the foregoing disclosure and the following detailed description of various example embodiments, it will be apparent to those skilled in the art that the present disclosure provides a significant advance in the art of methods for facilitating communication between a subset of connections that connect to a web application. Additional features and advantages of various example embodiments will be better understood in view of the detailed description provided below.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

Figure 1:
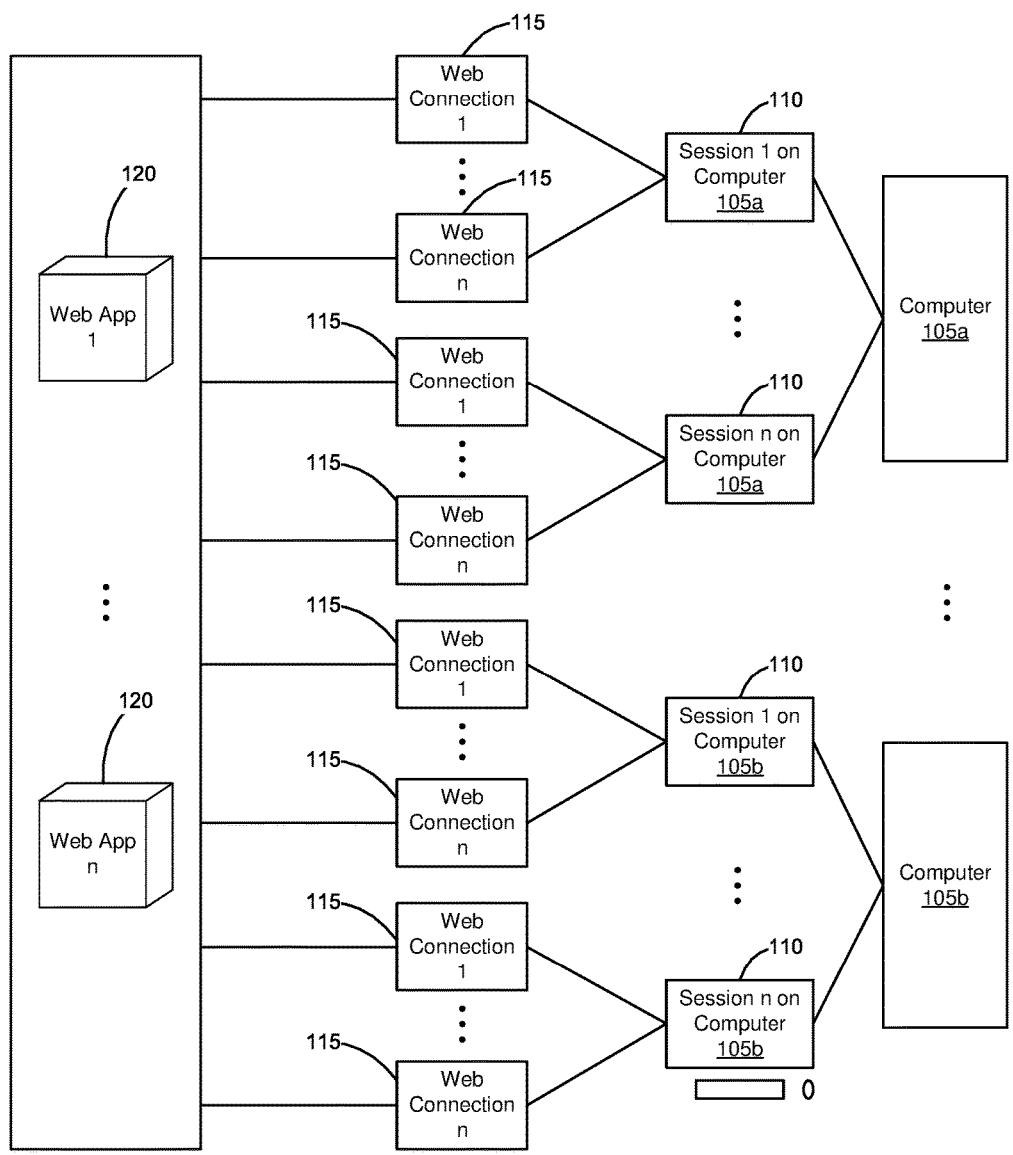
FIG. 1 shows an example prior art system showing example computers having established web connections to corresponding web applications, the web connections occurring on a session running on a computer.

It is to be understood that the disclosure is not limited to the details of construction and the arrangement of components set forth in the following description or illustrated in the drawings. The disclosure is capable of other example embodiments and of being practiced or of being carried out in various ways. For example, other example embodiments may incorporate structural, chronological, process, and other changes. Examples merely typify possible variations. Individual components and functions are optional unless explicitly required, and the sequence of operations may vary. Portions and features of some example embodiments may be included in or substituted for those of others. The scope of the disclosure encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Further, the use of the terms "a" and "an" herein do not denote a limitation of quantity but rather denote the presence of at least one of the referenced item.

In addition, it should be understood that example embodiments of the disclosure include both hardware and electronic components or modules that, for purposes of discussion, may be illustrated and described as if the majority of the components were implemented solely in hardware.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps, or combinations of special purpose hardware and computer instructions.

Disclosed are a system and methods for facilitating communication among a subset of connections to a web application. One example method for facilitating communication among the subset of web connections connecting to a web application includes receiving an indication that a connection to the web application has been established. The web connection is then identified to be either a potential host connection or a potential client connection. The example method includes creating a connection group having one or more members that includes one of the host and the client connection. In one example embodiment, the members of a connection group includes web connections that are connecting to the same web software, have the same credentials, and are running on the same session. The connection group is created or joined if the connection group has already been created when an established web connection has defined credentials, when the connection group is for the web application being connecting to and when there is a host connection designated for the connection group. The created connection group allows the members of the connection group to communicate with each other by a facilitator receiving a request from at least one of the members of the connection group for a message to be communicated to the other members of the connection group; and the facilitator sending the message received from at least one of the members to all the other members of the connection group.

FIG. 1 shows an example prior art system 100 showing example computers having established web connections to corresponding web applications, the web connections occurring on a session running on the computer. System 100 includes computers 105a and 105b from which a number of sessions 110 are running Each session may include a number of web connections 115 that connect to one or more web applications 120. Web connections 115 may be connected to the one or more web applications 120 using one or more credentials.

Computers 105a, 105b may be any computing devices that are capable of performing instructions, running applications and connect to a remote server to access a web application. Example computers 105a, 105b may include laptop computers, personal computers, tablet computers, mobile phones, among others. Computing devices 105a, 105b may be virtual or non-virtual.

Sessions 110 may refer to a user's session when the user is logged into an operating system (OS). The user may enter identifier information such as, for example, a username and/or a password, into the OS in computers 105a and/or 105b and gain access to the OS using the identifier information. Sessions 110 may also refer to a period of use the user has when logged into the OS using computers 105a, 105b and the user's session may begin when the user gains access to the computer and/or OS, and ends when the user quits or logs off from the computer and/or the OS. Session information may include details regarding the user's login session such as, for example, the user credentials including the username, the operating system the user is logged into, an identifier of computers 105a, 105b, and a timestamp of the session, among others.

In one example embodiment, computers 105a, 105b may include a number of sessions 110 such that one or more users may be logged into the computer at a given time. A session may remain active unless the user has specifically logged off of the operating system on at least one of computers 105a, 105b.

Web connections 115 may be connections established by a user to a web application 120 using at least one of computers 105a, 105b. Web connections 115 may be facilitated by any software that has the capabilities of connecting to the web software 120 using the network.

Web application 120 which may also be referred to herein as web software is a web development work or program accessible by a user via an application such as, for example, a web browser installed in computers 105a, 105b. Web application 120 may be an application that is used over the internet using the web browser such as, for example, a client-server application wherein the client or the user interface of the application runs in the web browser and is accessed via the internet.

The user may use the web browser (not shown) to access the web application 120, which establishes a web connection between the computers 105a, 105b and the web application 120 on a given session 110. The user may connect to web application 120 using credentials such as a username and/or password. A session 110 may have multiple web connections 115 that are connected to one or more web application 120. An active session may also have multiple web connections to the same application such as, for example, when a user logs into or accesses the same web application using two or more web browsers.

Figure 2:
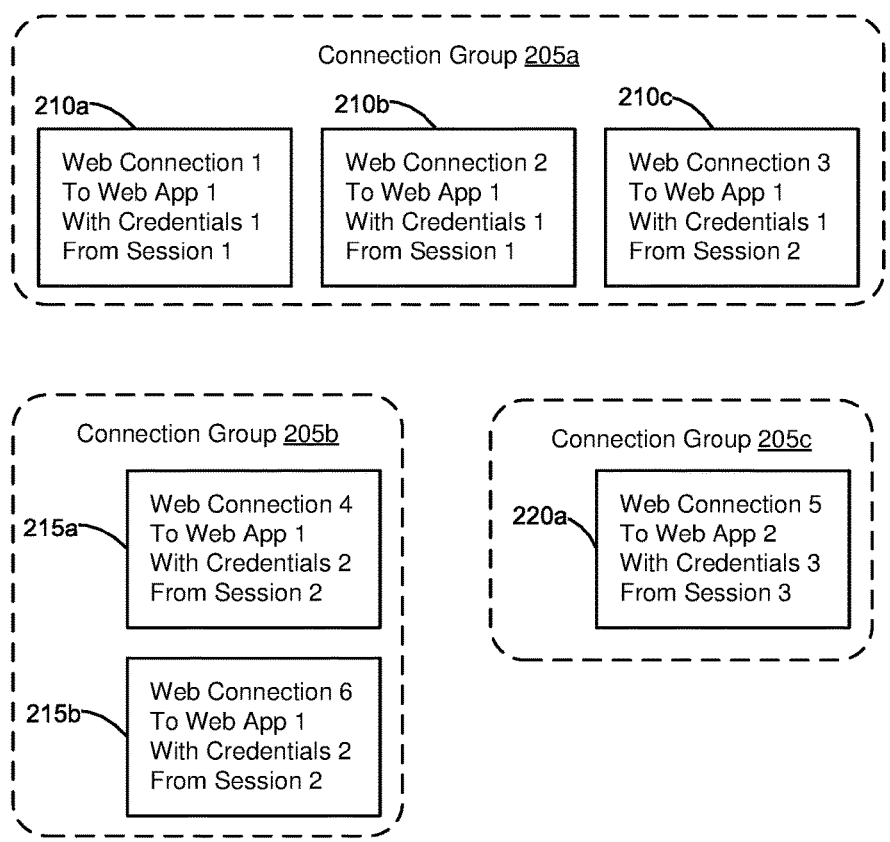
FIG. 2 shows a block diagram of example connection groups for use in facilitating communication among web connections.

FIG. 2 shows a block diagram of example connection groups. The block diagram illustrates example connections groups that may be considered valid and invalid for the purposes of the disclosure. To facilitate cross-web connection communication, a method to group similar web connections may be desired. A connection group may be a set of web connections running on a given session where data can be sent and received amongst members. The members of the connection group may be selected partially based on what web application the web connection is connected to and what credentials the web connection is using such that similar web connections that belong in a group are able to communicate. The connection group may be created using web sockets and other communication technology as will be known in the art.

As can be seen in the example Connection Group 205a, the web connections that are connected to the same web application using the same credentials may come from multiple sessions. When sending data to Connection Group 205a, a data source may be sending data that was not meant to be sent to a web connection that is on a different session such as, for example, web connection 210c which is on Session 2. Even if the web connection is logged into the same web application using the same credentials, there is still a need to preclude web connections that are on different sessions such that only web connections connecting to the same web application, using the same credentials, and are on the same sessions are added to a connection group and are allowed to communicate with each other. There are applications that may wish to securely send data to a connection group that include web connections that come from the one active session on the same computing device and preclude those that come from different sessions, are connected to a different web application and/or may have different credentials.

By chance, example Connection Group 205b includes two web connections 215a and 215b that are connected to the same web application 1 using the same credentials 2 and are on the same sessions 2. However, it is possible that a new connection might join Connection Group 205b that do not share the same characteristics as the first two web connections, making Connection Group 205b unsafe for the purposes described above.

To ensure that all the web connections in a connection group are connected to the same web application using the same credentials and are on the same session, and in order to create a safe connection group containing web connections that are grouped using the above-mentioned criteria, a method to uniquely identify individual sessions may be desired and session information may be needed. However, web connections do not necessarily have knowledge about the session they are on. Session information may also not be readily available for all instances making it difficult to effectively group web connections by what session they belong. There are some web connections that come from browsers that do not have access to operating system information and consequently, to session information. Some browsers that do have access to OS information may still not provide sufficient information, or sufficiently unique information to accurately and efficiently identify a session.

Figure 3:
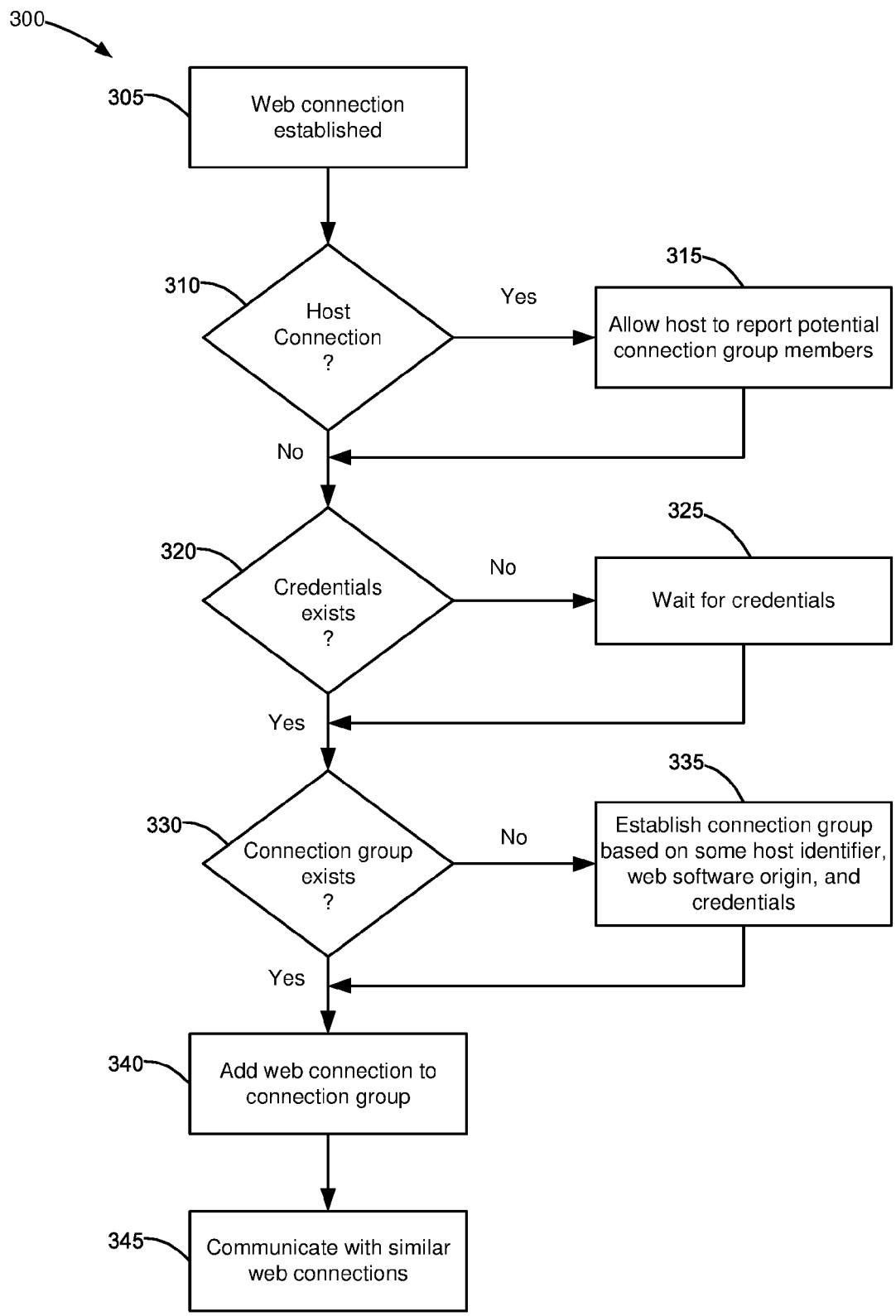
FIG. 3 shows an example method 300 of creating a connection group to facilitate communication among a subset of web connections to a web application.

FIG. 3 shows an example method 300 of creating a connection group to facilitate communication between a subset of web connections to a web application. Method 300 may create a connection group that includes web connections grouped by what web application they are connected to, the credentials they are using, and by what session they are coming from. Method 300 creates a group of web connections that precludes web connections coming from different sessions and keeps communications among web connections that come from the same session, the same user, and/or are connected to the same web application.

Method 300 may be performed by a facilitator which is an application that may be installed locally on a user's machine. In an alternative example embodiment, the facilitator may be running on a remote server communicatively connected to the computing device running the session. The web connections may connect to the facilitator through the remote server using a given URL, or through one or more communication techniques as will be known in the art.

At block 305, the facilitator may detect a web connection established on a session. Upon web connection, the facilitator may be provided information regarding the web connection such as, for example, the web application being connected to and the credentials that are tied to the web connection. Web connections that are established on a given session may connect to the facilitator thereby notifying the facilitator that one or more web connections have been established on the session and that each of the web connections may either be potential host or client connection for a connection group. Configuring web connections that are established on a given session to connect to the facilitator allows the facilitator to classify each of the established web connections to an appropriate connection group.

The facilitator may designate one web connection in each session to be the host web connection for a connection group. The host web connection may be a web connection that is running on the operating system itself, which allows the facilitator to designate one host web connection per session. In some alternative example embodiments, the host logic may be running within a different web application, and in such alternative embodiments, the web application may be installed directly on the operating system. In yet other example embodiments, the web application may be a plugin installed in another web browser. The facilitator may choose which web connection to designate as the host by determining if the web connection includes a predetermined user agent string. The predetermined user agent string may be provided by a software application that is installed on the computer that is running on the session as a web connection. In one example embodiment, the OS may be configured to have one running instance of such a software application, thereby ensuring that one host web connection is assigned per session in the operating system. In one alternative example embodiment, a web connection that was predetermined to be a host connection for a connection group may send a message to the facilitator notifying the facilitator to designate the web connection as the host connection for a connection group.

In one example embodiment, the facilitator may provide a unique token to the established web connection that is a potential client connection for a connection group. The unique token identifies the web connection and provides information for the designated host connection to determine if the web connection is a potential client connection for the connection group.

At block 310, it is determined if the established web connection at block 305 is a designated host connection. The facilitator may determine if the established web connection is a designated host connection by checking if the established web connection includes the user agent string that the connection supplies when the web connection connects to the facilitator. In one example embodiment, the host web connection may be considered a native desktop application that connects to the facilitator the same way that client connections connect (e.g. through web sockets and other related technology), but the host web connection may be identified as the host web connection because it supplies the predetermined user agent string when it connects to the facilitator.

If the web connection is determined to be a designated host connection, the facilitator may assign a host logic or host-related functions to the web connection allowing the designated host web connection to report potential connection group members to the facilitator (at block 315). The host web connection may report potential connection group members to the facilitator as long as the host web connection remains active in the session.

If at block 310 it is determined that the established web connection at block 305 is not a designated host connection, the facilitator checks if credentials of the established web connection are available (at block 320). The facilitator may wait until the credentials are available (at block 325), and once available, it is determined if a connection group exists for the established web connection (at block 330).

Upon negative determination, a connection group is established or created based on an identifier of the host web connection, web application origin, and credentials associated with the established connection group (at block 335). However, if a connection group exists, the established web connection is added to the appropriate connection group (at block 340). Connection groups are created, or joined by a web connection if they have already been created, whenever a web connection has defined credentials, a web application that the web connection is connecting to, and a designated host web connection for the connection group. A web connection may be added to an already created connection group if the credentials and the web application associated with the web connection correspond to the credentials and the web application for the connection group. In one example embodiment, a connection group may be created for every corresponding pair of web application and credentials that have been established on a given session.

Once a web connection has been added as a member of the connection group, the members of the connection group are now able to communicate with each other via the facilitator (at block 345).

Figure 4:
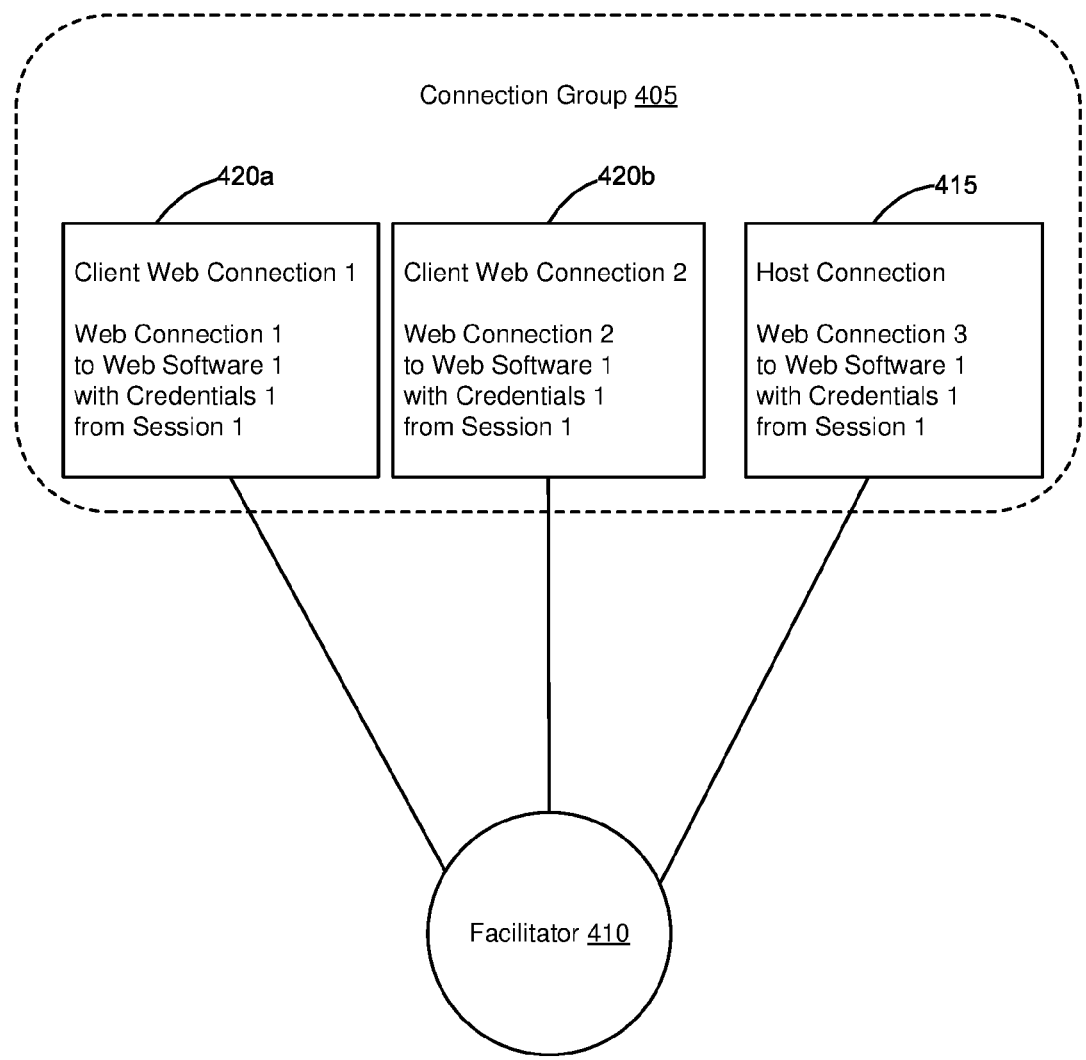
FIG. 4 shows a block diagram of an example connection group that includes a facilitator, a host connection, and client connections.

FIG. 4 shows a block diagram of an example connection group 405 that includes a facilitator 410, a host connection 415 and client connections 420a, 420b. Example connection group 405 may be used to communicate data between the web connection members within the connection group through facilitator 410. Host connection 415 and client connections 420a and 420b are connected to facilitator 410 via one or more communication methods such as, for example, configuring host connection 415 and client connections 420a and 420b to communicate with facilitator 410 via a URL or any other identifier of facilitator 410. The example connection group may be established using method 300 as discussed above.

Facilitator 410 identifies and brings qualified connections including both the designated host 415 and its respective client connections 420a and 420b together in one connection group 405. Qualified connections may include web connections that have common attributes such as the same web application they are connected to, the same credentials, and the same session. Once added to an appropriate connection group where members have defined credentials, web application connection, and host, the members of the connection group are able to communicate with each other through facilitator 410. The designated host connection 415 may be assigned one or more functions that allow the designated host to make calls to facilitator 410 to report and/or add client connections to the connection group. The designated host may identify potential client connections by looking for unique tokens that have been added to a web application's document object model (DOM).

When a potential client web connection is established, the web connection connects to facilitator 410 and is provided a unique token by facilitator 410. The unique token includes information that identifies the web connection and is placed in a portion of the web application's DOM such as, for example, in a <div> of the DOM. Once designated, host connection 415 uses the accessibility layer of the operating system to find web connections having the tokens indicating that the web connections are potential client connections for the connection group associated with the host connection. In one example embodiment, host connection 415 may poll the DOMs of open windows or active applications in a given session for the unique token at a predetermined interval. When host connection 415 finds a token associated with a potential client web connection, host connection 415 reports the found client to facilitator 410. When the facilitator 410 receives a notification that a client has been found, that client is added to its appropriate connection group.

In one alternative example embodiment, a potential client connection may display the unique token to the user and the user may provide the unique token to the host connection, thereby notifying the host connection of the active potential client connection that needs to be added to the connection group. The host connection may then transmit a request to the facilitator to add the potential client connection to the connection group.

An appropriate connection group is a connection group that contains web connections that share at least one of the same credentials, that are connected to the same web application and that are running on the same computer session. In one example embodiment, the designated host may identify potential client web connections local to each session such that hosts from different sessions are not able to add client web connections from other sessions. This allows for communication that is securely within the same session and is not reliant on influences that are outside the established connection group.

Facilitator 410 may include one or more messaging components that allow facilitator 410 to receive one or more requests from a web connection in a particular connection group to send to all the other member web connections in the connection group. For example, once connection group 405 has been established, client web connection 420a may wish to send a message to similar or related web connections that have been included in connection group 405. Client web connection 420a may make a call to facilitator 410 to request sending of the message and facilitator 410 may then send the message to all the members of connection group 405. The web connections communicating in one connection group do not affect communications that are occurring in another group. Any member of the connection group including facilitator 410 is able to send messages to the other members.

Figure 5:
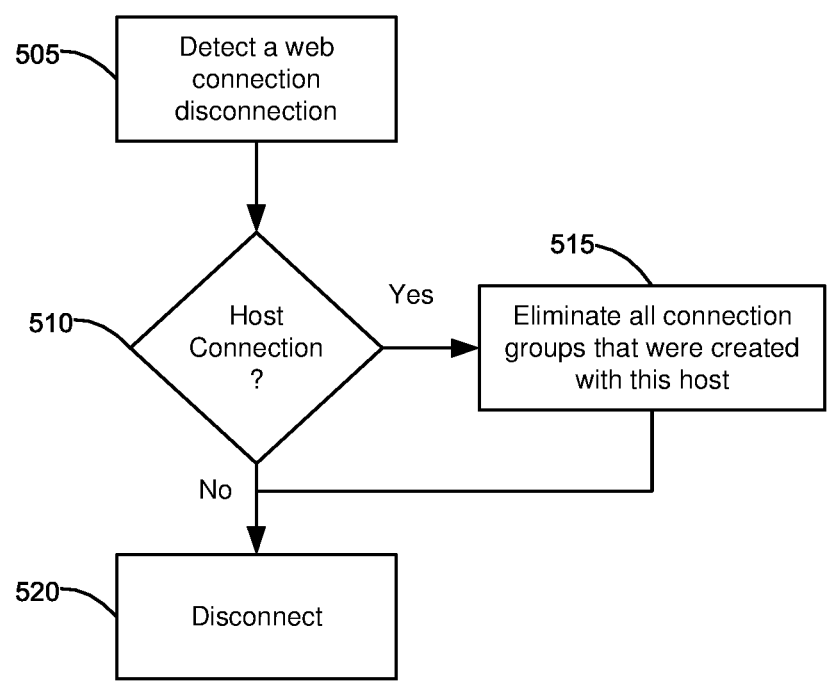
FIG. 5 is an example method that shows how facilitator handles a web connection disconnection within a connection group.

FIG. 5 is an example method 500 that shows how facilitator 410 handles a web connection disconnection within a connection group.

At block 505, facilitator 410 may detect a web connection disconnection, wherein at least one web connection from a connection group managed by facilitator 410 has disconnected. A web connection disconnection may occur when the web connection disconnects from the web application, logs off of the credentials used when the web connection was added to the connection group, and/or disconnects from the computer login session.

At block 510, facilitator 410 determines if the disconnecting web connection is the designated host for the connection group. Upon positive determination, the connection groups that were created with the disconnecting host as their designated host connection may be terminated (block 515). Terminating the connection groups removes the communication among the members of the group through facilitator 410.

Upon negative determination which indicates that the disconnecting web connection is a client connection, the disconnecting web connection is disconnected and removed from the connection group (at block 520). A web connection that has been removed from a connection group is unable to send and receive messages from the members of the connection group. The disconnection of the web connection from the connection group does not affect the communication of the remaining active members of the connection group.

It will be understood that the example applications described herein are illustrative and should not be considered limiting. It will be appreciated that the actions described and shown in the example flowcharts may be carried out or performed in any suitable order. It will also be appreciated that not all of the actions described in FIGS. 3 and 5 needs to be performed in accordance with the example embodiments of the disclosure and/or additional actions may be performed in accordance with other example embodiments of the disclosure.

Many modifications and other example embodiments of the disclosure set forth herein will come to mind to one skilled in the art to which these disclosure pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for facilitating communication among web connections connecting to a web application, comprising:
creating a connection group for one or more web connections connected to the web application in a session by:
receiving an indication that the one or more web connections to the web application are established in the session;
designating a web connection from the one or more web connections as a host connection of the connection group, the host connection having specified credentials; and
adding a web connection from the one or more web connections to the connection group if the web connection has credentials corresponding to the specified credentials of the host connection;
allowing the one or web connections of the connection group to communicate with each other by receiving a request from at least one of the one or web connections for a message to be communicated to other one or more web connections in the connection group;
sending the message received from at least one of the one or web connections to the other one or more web connections in the connection group;
providing a unique token to the one or more web connections to the web application that are established in the session;
receiving a potential web connection to be added to the connection group from the host connection; and
identifying, by the host connection, if one of the web connections is the potential web connection to be added to the connection group by determining if the web connection includes the unique token.

2. The method of claim 1, wherein the designating the web connection from the one or more web connections as the host connection of the connection group includes determining if the web connection includes a predetermined user agent string.

3. The method of claim 1, wherein the identifying, by the host connection, the potential web connection to be added to the connection group is performed by polling one or more applications running in the session for the unique token.

4. The method of claim 3, wherein the polling the one or more applications running in the session for the unique token is performed by the host connection at a predetermined interval.

5. The method of claim 1, further comprising terminating the connection group if the host connection is determined to be disconnected from the web application.

6. A computing device having a non-transitory computer readable storage medium containing one or more instructions for facilitating communication among web connections connected to a web application, the one or more instructions comprising:

creating a connection group for one or more web connections connected to the web application in a session by:
receiving an indication that the one or more web connections to the web application are established in the session;
designating a web connection from the one or more web connections as a host connection of the connection group, the host connection having specified credentials; and
adding a web connection from the one or more web connections to the connection group if the web connection has credentials corresponding to the specified credentials of the host connection;
allowing the one or web connections of the connection group to communicate with each other by receiving a request from at least one of the one or web connections for a message to be communicated to other one or more web connections in the connection group;
sending the message received from at least one of the one or web connections to the other one or more web connections in the connection group;
providing a unique token to the one or more web connections to the web application that are established in the session;
receiving a potential web connection to be added to the connection group from the host connection; and
identifying, by the host connection, if one of the web connections is the potential web connection to be added to the connection group by determining if the web connection includes the unique token.

7. The computing device of claim 6, wherein the designating the web connection from the one or more web connections as the host connection of the connection group includes determining if the web connection includes a predetermined user agent string.

8. The meth computing device of claim 6, wherein the identifying, by the host connection, the potential web connection to be added to the connection group is performed by polling one or more applications running in the session for the unique token.

9. The computing device of claim 8, wherein the polling the one or more applications running in the session for the unique token is performed by the host connection at a predetermined interval.

10. The computing device of claim 6, further comprising instructions for terminating the connection group if the host connection is determined to be disconnected from the web application.

11. A product comprising a non-transitory computer readable storage medium containing one or more instructions for facilitating communication among web connections connected to a web application, the one or more instructions comprising:
creating a connection group for one or more web connections connected to the web application in a session by:
receiving an indication that the one or more web connections to the web application are established in the session;
designating a web connection from the one or more web connections as a host connection of the connection group, the host connection having specified credentials; and
adding a web connection from the one or more web connections to the connection group if the web connection has credentials corresponding to the specified credentials of the host connection;
allowing the one or web connections of the connection group to communicate with each other by receiving a request from at least one of the one or web connections for a message to be communicated to other one or more web connections in the connection group;
sending the message received from at least one of the one or web connections to the other one or more web connections in the connection group;
providing a unique token to the one or more web connections to the web application that are established in the session;
receiving a potential web connection to be added to the connection group from the host connection; and
identifying, by the host connection, if one of the web connections is the potential web connection to be added to the connection group by determining if the web connection includes the unique token.

12. The product of claim 11, wherein the designating the web connection from the one or more web connections as the host connection of the connection group includes determining if the web connection includes a predetermined user agent string.

13. The product of claim 11, wherein the identifying, by the host connection, the potential web connection to be added to the connection group is performed by polling one or more applications running in the session for the unique token.

14. The product of claim 13, wherein the polling the one or more applications running in the session for the unique token is performed by the host connection at a predetermined interval.

15. The product of claim 11, further comprising instructions for terminating the connection group if the host connection is determined to be disconnected from the web application.

* * * * *